Sept. 11, 1962    J. C. OGLE, JR., ETAL    3,053,698
ELECTRICALLY CONDUCTIVE MULTI-LAYER TRANSPARENT
ARTICLE AND METHOD FOR MAKING THE SAME
Filed April 11, 1958

INVENTORS
James C. Ogle, Jr. and
BY Dwight W. Barkley
Nobbe & Swope
ATTORNEYS

United States Patent Office 3,053,698
Patented Sept. 11, 1962

3,053,698
ELECTRICALLY CONDUCTIVE MULTILAYER TRANSPARENT ARTICLE AND METHOD FOR MAKING THE SAME
James C. Ogle, Jr., Tarentum, and Dwight W. Barkley, New Kensington, Pa., assignors to Libbey-Owens-Ford Glass Company, Toledo, Ohio, a corporation of Ohio
Filed Apr. 11, 1958, Ser. No. 727,809
16 Claims. (Cl. 117—211)

This invention relates to articles having filmed surfaces, and more particularly to sheets of transparent material having a transparent electrically conducting film thereon and to a method of making the same.

Transparent electrically conducting sheet materials are used where it is necessary to heat the surface of an article such as a de-icing type windshield or where it is necessary to dissipate static electric charges. Such articles are made by applying a transparent electrically conducting film on a sheet of glass or other siliceous materials by means of molecular deposition, such as disclosed in U.S. Patent No. 2,628,927 to William H. Colbert et al., issued February 19, 1953. While this method has proven generally satisfactory for the production of transparent electrically conducting films on glass surfaces, it is essential in certain cases to produce an electrically conducting article provided with a film of exceptionally uniform thickness in order to obtain greater adhesion and extremely uniform current flow. We have found that no matter how carefully the surface of the glass sheet is prepared prior to filming by conventional methods, such as by grinding and polishing, the surface which is to carry the electrically conducting film is still relatively uneven in that it contains microscopic imperfections.

This uneven surface makes the production of films having uniform electrical resistance difficult because variations in the surface smoothness of the sheets cause variations in the thickness of the film. This is of course undesirable because slight variations in film thickness will result in areas of variable electrical conductivity and thus hot spots or unevenly heated areas will develop in the thicker areas of the film.

We have also found that this objection can be overcome by providing upon the surface of the glass sheet a base layer which will fill any irregularities in this surface and thus present an exceptionally smooth exposed surface upon which the electrically conducting film can be deposited. By depositing first an adhesive layer and then an electrically conducting film on the extremely smooth surface of the base layer it has been found that the film is exceptionally uniform in thickness. This uniformity ensures effective adhesion between the glass and the electrically conductive film throughout the entire filmed surface.

Accordingly, it is a primary object of this invention to provide a method of placing a film of uniform thickness upon the surface of a support body.

Another object of this invention is to provide a transparent sheet having an exceptionally smooth surface in contact with a tightly adherent uniformly thick electrically conducting film of uniform electrical resistance.

Another object of this invention is to provide a transparent electrically conducting article having a tightly adherent uniformly thick electrically conducting film.

A further object of this invention is to provide an electrically conducting transparent article which may be formed or shaped into complex configurations.

Other objects and advantages of the invention will become more apparent during the course of the following description when taken in connection with the accompanying drawings.

In the drawings wherein like numerals are employed to designate like parts throughout the same:

Figure 1:
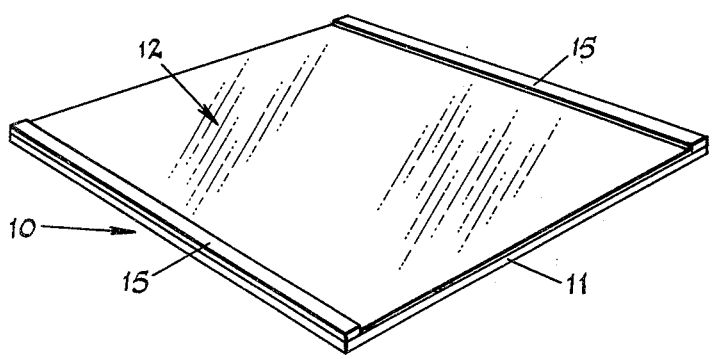
FIG. 1 is a perspective view of a transparent panel having an electrically conducting film which has been applied in accordance with this invention.
Figure 2:
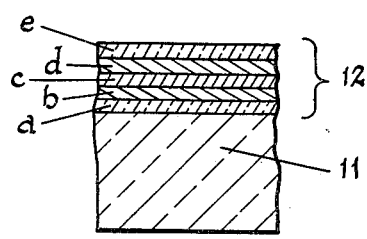
FIG. 2 is a cross section of the panel of FIG. 1 illustrating the various components of the electrically conducting film of this invention.

Referring now in detail to a preferred form of the invention, there is shown in FIG. 1, a transparent electrically conducting panel 10 which comprises a sheet of glass or other siliceous material 11 and a multi-layer transparent coating 12 on one surface thereof. As shown in FIG. 2, the multi-layer coating 12 comprises a relatively hard smooth base layer $a$ in contact with a surface of the glass sheet 11, an adhesive layer $b$ over the base layer, an electrically conducting film $c$ comprising a layer of electrically conductive metal in contact with the adhesive layer $b$, a second adhesive layer $d$, which is usually similar to the adhesive layer $b$, in contact with the electrically conductive film $c$ and a protective layer $e$ such as quartz, aluminum oxide, magnesium fluoride, silica and the like applied over the second adhesive layer $d$.

Figure 3:
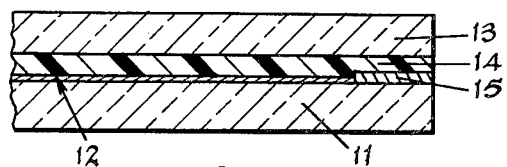
FIG. 3 is a cross section of a laminate comprising a transparent electrically conducting panel as a component.

As shown in FIG. 3, the glass sheet 11 having the multi-layer coating 12 on a surface thereof may be laminated with another glass sheet 13 by means of a plastic interlayer 14 to form a laminated transparent electrically conducting unit. The interlayer 14 may be any plastic sheet which is suitable for laminating glass sheets, and a preferred material is polyvinyl butyral. We have found that good adherence between the plastic interlayer and the protective layer $e$ of film 12 can be obtained, and especially good results are obtained when the protective layer $e$ is composed mainly of silica or similar material. The actual laminating may be done by any of the conventional laminating techniques such as by placing an assembly of the plastic between a pair of glass plates, placing the assembly in a bag, evacuating the bag to remove the air from within the bag and from between the assembled sheets, and subjecting the unit to heat and pressure in an autoclave to provide a composite article.

According to a preferred embodiment of the present invention, the glass sheet 11 is mounted in a suitable vacuum chamber for filming by molecular deposition as disclosed in the aforementioned Patent No. 2,628,927. In order to provide a relatively hard base and to ensure a uniformly smooth surface for receiving the adhesive layer $b$ and electrically conductive film $c$, a suitable base layer $a$ is first placed on the sheet 11 by molecular deposition until a coating approximately $1/20$ wave length in thickness is provided. This base layer may consist of $MgF_2$, ZnS, SiO, $SiO_2$, $Al_2O_3$, TiO, $TiO_2$, $ZrO_2$ or $ZrSiO_4$.

While a base layer having a thickness of approximately $1/20$ wave length is preferred in most instances, it has been found that a base layer of magnesium fluoride gives exceptionally good results when its thickness is slightly less than $1/20$ wave length. The quartz and silicon monoxide base layers exhibited their best characteristics when the layer was somewhat thicker than $1/20$ wave length. The aluminum oxide and zirconium orthosilicate base layers are preferred if the electrically conducting film is to be heated to a temperature which is higher than that normally found in such films.

After the base layer is applied, the adhesive layer $b$, which is generally a metal oxide and preferably an iron oxide, is applied over the base coating. This adhesive layer may be deposited on the layer $a$ by molecular deposition or a metal may be deposited on the base layer and oxidized to form a metal oxide on layer $a$. A preferred adhesive layer is $Fe_2O_3$ and it is important to keep this adhesive layer $b$ relatively thin. For example, layers of approximately ½ molecule in average thickness have been found to be exceptionally good.

After the metal oxide adhesive layer $b$ has been placed on the support body, the electrically conductive film $c$ is deposited over the adhesive layer by means of molecular deposition as disclosed in the aforementioned Patent No. 2,628,927 so that an extremely uniform coating is formed. This transparent electrically conductive film $c$ is preferably gold, but it may also be silver or copper as disclosed in Patent No. 2,628,927. By using molecular deposition methods to deposit the electrically conductive film $c$, one molecule is deposited upon another in a manner to form a smooth surface over the adhesive layer $b$. The adhesive layer acts to strongly secure the metal conductive layer to the sheet 11 through the base layer $a$.

Over the electrically conductive metal layer $c$ there is placed a second adhesive layer $d$ formed of a metallic oxide, such as described above in connection with the adhesive layer $b$, for the purpose of securing the protective layer $e$ such as quartz or silica to the conductive layer. The protective layer helps to protect the conductive layer $c$ from mars or scratches which tend to break some of the electrical paths across the layer causing current concentrations or localized heating to develop and to provide adherence to laminating plastic interlayers as mentioned above.

To supply power to the electrically conductive film $c$ spaced electrodes 15 are provided along a pair of opposed marginal edges of the film. These electrodes may be placed in contact with the conductive film $c$ before the adhesive layer $d$ and protective layer $e$ are placed over the conductive film $c$ or the conductive film $c$ may be masked along the marginal edge areas during the deposition of the adhesive layer $d$ and the protective layer $e$. Layers $d$ and $e$ may be removed if desired so as to allow the electrodes to be placed in contact with the film $c$. If the layers $d$ and $e$ are relatively thin, the electrodes 15 may be placed in contact with one or the other of the layers, and current may be passed through the layer or layers from the electrodes to the conductive film $c$.

It is also desirable to place the electrodes 15 on the article at a temperature above the normal temperature at which the transparent sheet 11 and the electrically conductive film 12 are to be heated when power is applied to the conductive layer. This reduces the effect of the expansion of the heated sheet 11 on the electrodes 15 inasmuch as the electrodes are thereby kept in compression.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. The method of making a multi-layer article having a uniform adhesive film for greater adhesion and a uniform electrically conducting film for uniform current flow, which comprises providing on a support structure by deposition from a vapor an approximately $\frac{1}{20}$ wave length thick, relatively hard, extremely smooth surfaced base film other than an iron oxide film, superimposing in intimate contact on said base film by deposition from a vapor an adhesive film of iron oxide, and depositing an electrically conducting metallic film from a vapor onto said adhesive film.

2. The method as defined in claim 1, in which the base film is magnesium fluoride.

3. The method as defined in claim 1, in which the base film is zinc sulphide.

4. The method as defined in claim 1, in which the base film is silicon monoxide.

5. The method as defined in claim 1, in which the base film is quartz.

6. The method as defined in claim 1, in which the base film is aluminum oxide.

7. The method as defined in claim 1, in which the base film is titanium oxide.

8. The method as defined in claim 1, in which the base film is titanium dioxide.

9. The method as defined in claim 1, in which the base film is zirconium oxide.

10. The method as defined in claim 1, in which the base film is zirconium orthosilicate.

11. A filmed sheet which comprises a support body, a relatively hard, extremely smooth surfaced base layer approximately $\frac{1}{20}$ wave length thick deposited upon said support body and filling any irregularities in the surface thereof, a metallic oxide adhesive layer distinct from but in contact with said base layer, and an electrically conducting metallic film in contact with said adhesive layer.

12. A filmed sheet which comprises a support body, a relatively hard, extremely smooth surfaced base layer of a material selected from the group consisting of $MgF_2$, $ZnS$, $SiO$, $SiO_2$, $Al_2O_3$, $TiO$, $TiO_2$, $ZrO_2$ and $ZrSiO_4$ contacting said support body and filling any irregularities in the surface thereof, a metallic oxide adhesive layer distinct from but in contact with said base layer, and an electrically conducting metallic film contacting said adhesive layer.

13. A filmed sheet which comprises a support body, a base layer approximately $\frac{1}{20}$ wave length thick of a material selected from the group consisting of $MgF_2$, $ZnS$, $SiO$, $SiO_2$, $Al_2O_3$, $TiO$, $TiO_2$, $ZrO_2$ and $ZrSiO_4$ contacting said support body, a metallic oxide adhesive layer distinct from but in contact with said base layer, and an electrically conducting metallic film contacting said adhesive layer.

14. An electrically conducting article comprising a support body, a molecularly deposited, relatively hard and extremely smooth surfaced base layer in contact with a surface of the support body and filling any irregularities in the surface thereof, a molecularly deposited metallic oxide adhesive layer distinct from but contacting said base layer, a molecularly deposited electrically conducting metallic film contacting said adhesive layer, and spaced electrodes contacting marginal surface portions of said electrically conducting film.

15. An electrically conducting article as claimed in claim 14, wherein the base layer is approximately $\frac{1}{20}$ wave length thick.

16. An electrically conducting article as claimed in claim 14, wherein the base layer is of a material selected from the group consisting of $MgF_2$, $ZnS$, $SiO$, $SiO_2$, $Al_2O_3$, $TiO$, $TiO_2$, $ZrO_2$ and $ZrSiO_4$.

References Cited in the file of this patent

UNITED STATES PATENTS

| | | |
|---|---|---|
| 2,606,955 | Herrick | Aug. 12, 1952 |
| 2,628,921 | Weinrich | Feb. 17, 1953 |
| 2,628,927 | Colbert et al. | Feb. 17, 1953 |
| 2,702,259 | Sommer | Feb. 15, 1955 |
| 2,761,945 | Colbert et al. | Sept. 4, 1956 |
| 2,808,351 | Colbert et al. | Oct. 1, 1957 |

OTHER REFERENCES

Holland: "Vacuum Deposition of Thin Films," 1956, John Wiley and Sons Inc., plates 4(a) and 4(b).

Davy: "Industrial High Vacuum," 1951, Sir Isaac Pitman and Sons Ltd., page 164.